June 30, 1970   E. T. NATALE ET AL   3,518,070

MANUFACTURE OF HIGH OPTICAL QUALITY GLASS RODS

Filed Feb. 23, 1967

EUGENE T. NATALE
HARRY F. HICKS JR.
INVENTORS

BY *Leonard W. Treash, Jr.*
*Robert W. Hampton*
ATTORNEYS

United States Patent Office 3,518,070
Patented June 30, 1970

3,518,070
MANUFACTURE OF HIGH OPTICAL QUALITY GLASS RODS
Eugene T. Natale and Harry F. Hicks, Jr., Rochester, N.Y., assignors to Eastman Kodak Company, Rochester, N.Y., a corporation of New Jersey
Filed Feb. 23, 1967, Ser. No. 618,072
Int. Cl. C03b 21/00
U.S. Cl. 65—102                               4 Claims

ABSTRACT OF THE DISCLOSURE

Long glass rods of high optical quality are made from a compact glass spiral by heating the spiral and unwinding it. Optical quality suitable for a laser application has been obtained.

---

The present invention relates to the manufacture of long glass elements of high optical quality and more particularly to a method of making long striae-free glass elements having a high degree of optical homogeneity suitable among other uses for use as long glass laser rods which are one form of optical element requiring such high quality, homogeneity.

An object of the present invention is to provide a method of manufacturing optical quality glass rods having lengths greater than the rod lengths which can conveniently be made by known or conventional techniques.

Although suitable for producing short elements, say less than 30 inches, conventional techniques fail or become too cumbersome when applied to the making of elements longer than 30 inches, it being understood that the stated length of 30 inches is illustrative and not limiting.

Conventional methods presently employed include casting to size and extruding or drawing. Since glass in close proximity to a mold is generally contaminated the glass piece must be cast to a length greater than that of the finished rod and thus is wasteful. Also, the casting method requires a preheated mold and therefore, for long rods, furnaces of corresponding depth must be provided in close proximity to the melting facility. Further, in long molds "fold-over" and striae are more apt to occur as the molten glass flows in the mold during casting. Both extrusion and drawing introduce impurities which lower the optical quality and damage threshold mainly because remelting is employed.

In accordance with the present invention the aforesaid shortcomings and limitations are eliminated by cutting a spiral slot into a flat block (slab) of glass to form a glass spiral, heating the block to its Littleton flow point and unwinding the glass spiral to form a glass rod.

This rather laconic statement of the invention does not alert skilled optical workers to the remarkable contribution the invention made to the art for what really surprised the experts was that an unwound spiral resulting from the practice of the invention has high optical quality throughout its volume.

Accordingly another object of the invention is to provide a method for forming from a flat block of glass a glass rod having a length many times any linear dimension of the major surfaces of the flat block of glass, it being understood that the major surfaces of said block are essentially parallel and distinctly greater than its minor surfaces.

Stated in greater detail the present invention may be practiced as follows:

(1) A spiral cut is made by known sawing techniques in a flat glass block of the desired thickness and with major surface dimensions sufficient to yield a rod of the desired length and cross section.

(2) A stainless steel ribbon is interleaved in the saw cut and the block which now constitutes a glass spiral is mounted in a vertical plane in a fixture adapted to permit the glass spiral to be unwound when the glass in the spiral becomes sufficiently plastic.

(3) The fixture with the glass spiral mounted thereon is placed in a furnace the temperature of which is raised over the anneal point at a rate of rise ambient to 1000° F. in 72 hours.

(4) When the glass spiral approaches the flow or softening point (about 950° F. for the glass described in Pat. No. 2,787,554 to De Paolis) the steel ribbon is placed under longitudinal tension to cause the spiral to unwind and lie straight on an adjacent flat surface.

(5) Thereafter the furnace temperature is gradually lowered to room temperature at a rate of 1000° F. to ambient in 168 hours.

The cool straight glass rod is then processed to the desired cross section, usually circular which is the most efficient, using normal Blanchard grinding and centerless grinding techniques.

At the present time the long glass rods of high optical quality made available by the present invention are primarily utilized for making lasers but this end use is not restrictive. However, it may be well to comment that while as far as is known any glass may be used in practicing the invention, some glasses are better hosts than others for laser doping and that there are certain advantages to making lasers out of high index optical glass of the type first described by Morey in his Reissue Patent 21,175. The glasses described in the above identified De Paolis patent and by Eberlin in Pat. No. 2,206,081 are examples of a growing number of optical glasses frequently referred to as being of the Morey type. Tests have shown that lasing of a 36 inch glass rod fabricated by the unwinding technique of the present invention and a 36 inch straight cast glass rod delivered comparable output energies.

The basic mathematical formula relating rod length to the size of a circular glass block may be expressed as $$lw = \frac{\pi d^2}{4}$$

where $l$ and $w$ are the length and width, respectively, of the rod and $d$ is the diameter of the block.

Thus, where $w$ equals one inch, a 10-inch circular block of glass one inch thick should produce a square rod 78.5 inches long. In practice a square block of glass is cast because of easier mold construction as well as being more readily restrained during the sawing of the spiral slot which starts at one corner and works towards the center.

The invention together with further objects thereof will be more fully understood from the following description taken in connection with the accompanying drawing in which.

Figure 1:
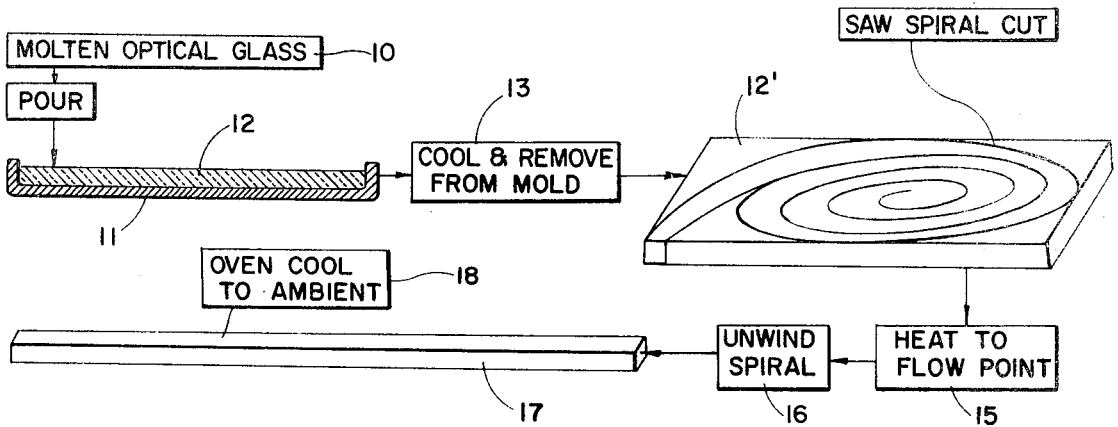
FIG. 1 is a semipictorial flow chart illustrating the practice of the invention.

As shown in FIG. 1 molten optical glass 10 is poured into a mold 11 to cast a block of glass 12 of the desired thickness, and then cooled and removed from the mold 11 as step 13 in the process to produce the block of glass 12' as a separate entity. A spiral slot is cut by conventional sawing techniques in the glass block 12' to provide a spiral 14 of cast glass having dimensions when unwound at least equal to the dimensions of the rod being manufactured. The glass spiral 14 is placed in a furnace 15 and heated to its Littleton flow point and then unwound as step 16 to form a glass rod 17. Thereafter the rod 17 is slowly cooled to ambient in an oven or furnace 18 which in practice will usually be the furnace 15.

Figure 2:
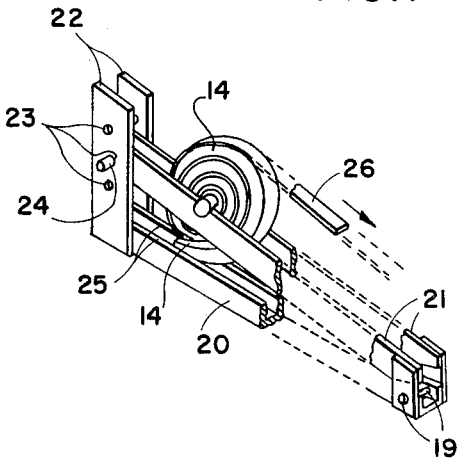
FIG. 2 is a view in perspective of a fixture useful in practicing the invention.

One embodiment of a fixture which may be employed for unwinding the glass spiral 14 is shown in FIG. 2 as comprising a U-shaped base channel member 20 above which inclined guide tracks 21 are supported at their higher end by a pair of upright plates 22 secured as by welding to one end of the channel member 20. The lower end of the tracks 21 is pivotally mounted on pins 19 provided on the other end of the channel member 20 for limited adjustment of the incline angle of the tracks 21 as by choice of which of the holes 23 in the upright plates 22 a supporting pin 24 is placed. Of course the separate holes 23 may be replaced by an arcuate slot and well known fastening means for holding the tracks 21 in any adjusted position.

In utilizing the fixture of FIG. 2 for unwinding the glass spiral 14 a hole is drilled near the center of the spiral 14 into which is inserted a roll bar 25 which may be grooved circumferentially to match the spacing of the tracks 21. A stainless steel ribbon 26 is interleaved in the saw cut in the glass spiral 14 as clearly shown in FIG. 3. The glass spiral 14 with the bar 25 and the ribbon 26 in place is mounted vertically between the tracks 21 with the distal end 14' of the spiral 14 in the base channel member 20 and with the ribbon 26 leaving the top of the spiral 14 as a tangent and extending to a position such as the lower end of the inclined tracks 21 where it is convenient to apply tension thereto as indicated by the tongs 27 and the arrow 28 (see FIG. 3).

Figure 3:
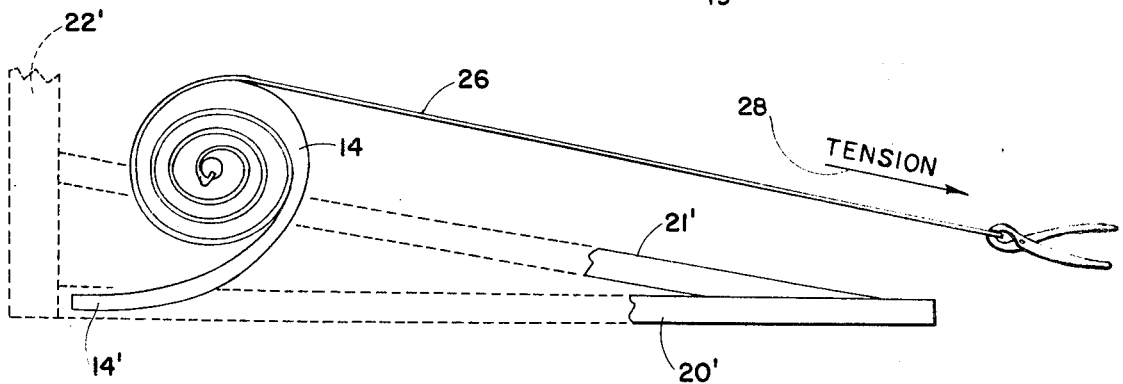
FIG. 3 is a side elevation of a partly phantom fixture illustrating one arrangement for unwinding a glass spiral.

The embodiment of an unwinding fixture shown in FIG. 3, mostly in phantom, differs from the fixture of FIG. 2 primarily in that the incline of its tracks 21' is fixed. Parts in FIG. 3 corresponding to parts in FIG. 2 are designated by the same reference numerals primed. As shown, the tracks 21' are welded to the channel member 20' at one end and both the member 20' and the tracks 21' are rigidly secured to the upright plates 22'. If found to be necessary the distal end 14' of the glass spiral 14 may be restrained in any suitable manner.

After mounting the glass spiral 14 on either of the fixtures of FIGS. 2 and 3 the entire unit is placed in a furnace such as the furnace 15 and heated to the Littleton flow point of the glass forming the spiral 14. The glass spiral 14 is then unwound and cooled as described in connection with FIG. 1.

It is to be understood that the above detailing of fixtures which may be of aid in unwinding the glass spiral 14 does not imply that the unwinding cannot be accomplished by hand manipulation by a skilled artisan in the glass working art.

While the foregoing description will enable those skilled to practice the invention by the best mode presently known, it is to be understood that the invention is not limited thereto but is of the scope of the appended claims.

What is claimed is:

1. A method of making a glass rod of high optical equality, including the steps of:
   cutting a block of cast glass into a spiral configuration;
   heating the glass spiral to its softening point;
   unwinding the glass spiral while it is at said softening point to form a glass rod; and
   thereafter gradually reducing the temperature of the glass rod to ambient temperature.

2. The rod making method in accordance with claim 1 including the step of grinding and polishing the glass rod to desired finished dimensions.

3. A method of making a glass rod of high optical quality, including the steps of:
   cutting glass into a spiral configuration from a slab of glass having two substantially flat, substantially parallel major surfaces;
   heating the glass spiral to its softening point;
   unwinding the glass spiral while it is at said softening point into a substantially straight rod; and
   thereafter gradually reducing the temperature of the glass rod to ambient temperature.

4. The method according to claim 3 wherein the major surfaces of said slab are substantially square and said sawing starts at one corner of said slab.

References Cited

UNITED STATES PATENTS

| 3,033,731 | 5/1962 | Cole | 65—4 |
| 3,247,755 | 4/1966 | Siegmund | 65—4 XR |

OTHER REFERENCES

"Concept of Classical Optics" by String, published by W. H. Freeman & Co. Inc., pages 553, 566 to 569 of appendix N.

FRANK W. MIGA, Primary Examiner

U.S. Cl. X.R.

65—2, 23, 105, 112; 331—94.5; 350—96